United States Patent
Liang et al.

(10) Patent No.: US 6,950,318 B2
(45) Date of Patent: Sep. 27, 2005

(54) FLYBACK CONVERTER FOR PERFORMING A ZERO VOLTAGE SWITCH IN BOUNDARY MODE

(75) Inventors: Jim H. Liang, Taipei (TW); Kuo-Chien Huang, Taipei (TW); Kun-Shan Pai, Taipei (TW); Po-Chueh Wang, Taipei (TW)

(73) Assignee: Skynet Electronic Co., Ltd., Taipei (TW)

( * ) Notice: Subject to any disclaimer, the term of this patent is extended or adjusted under 35 U.S.C. 154(b) by 0 days.

(21) Appl. No.: 10/824,471

(22) Filed: Apr. 15, 2004

(65) Prior Publication Data

US 2005/0185425 A1  Aug. 25, 2005

(30) Foreign Application Priority Data

Feb. 20, 2004  (TW) .............................. 93104243 A

(51) Int. Cl.[7] ........................................... H02M 3/335
(52) U.S. Cl. ..................... 363/16; 363/21.12
(58) Field of Search ........................ 363/16, 20, 21.01, 363/21.12

(56) References Cited

U.S. PATENT DOCUMENTS

| | | | | |
|---|---|---|---|---|
| 5,057,986 A | * | 10/1991 | Henze et al. ................... | 363/20 |
| 5,712,772 A | * | 1/1998 | Telefus et al. ............ | 363/21.02 |
| 5,805,434 A | * | 9/1998 | Vinciarelli et al. ........... | 363/16 |
| 6,771,518 B2 | * | 8/2004 | Orr et al. ....................... | 363/16 |
| 6,856,522 B1 | * | 2/2005 | Wittenbreder, Jr. ....... | 363/21.01 |

* cited by examiner

Primary Examiner—Adolf Berhane
(74) Attorney, Agent, or Firm—Bacon & Thomas PLLC

(57) ABSTRACT

The present invention is to provide a flyback converter by utilizing harmonic effect generated by a transformer thereof, after transferring electric energy in the transformer in a boundary mode, through cooperating with a simple control circuit to draw the charges stored in a main switch thereof out and enable the main switch to perform a zero voltage switch under a variety of loads in the boundary mode, which not only greatly reduces switch loss thereof, but also effectively limits an operating frequency of the main switch in a predetermined range to greatly decrease peak value of voltage caused by inductance leakage and have the advantages of high efficiency, high switching frequency and low noise without increasing the manufacturing cost.

9 Claims, 6 Drawing Sheets

FLYBACK CONVERTER FOR PERFORMING A ZERO VOLTAGE SWITCH IN BOUNDARY MODE

FIELD OF THE INVENTION

The present invention relates to flyback converters and more particularly to a flyback converter for performing a zero voltage switch in a boundary mode.

BACKGROUND OF THE INVENTION

Conventionally, a converter capable of operating in a boundary mode may be a ringing choke converter (hereinafter abbreviated as RCC), FIG. 1 shows the circuit diagram of a standard RCC. As stated above, since the standard RCC operates in the boundary mode, when a transformer T1 of the RCC transfers its electric energy to a secondary winding thereof having an output voltage Vo, a primary winding of the transformer T1 has a voltage Vo·n where n is a ratio of the primary winding to the secondary winding. That is, a voltage $V_{CE}$ of a switch transistor Q1 is equal to a sum of an input voltage Vin and the voltage Vo·n of the primary winding (i.e., Vin+Vo·n). The electric energy is stored in a parasite capacitor of the circuit in a form of voltage.

In the above-mentioned conventional RCC, when the electric energy stored in the transformer T1 is not sufficient to conduct a diode D1 being in series connection to the secondary winding of the RCC, the diode D1 is cut off and a harmonic is generated by the parasite capacitor and inductance of the circuit. After that, if the switch transistor Q1 is not switched again, the voltage $V_{CE}$ of the switch transistor Q1 oscillates as a sine wave centered on Vin having an amplitude equal to Vo·n. The sine wave shows an exponential decrease due to the effect of impedance in the circuit. FIG. 2 shows a waveform graph of the RCC operated in the boundary mode, wherein the dash lines shows the sine wave oscillation of the voltage $V_{CE}$ and the voltage $V_{CE}$ of the switch transistor Q1 has a minimum value of Vin−Vo·n.

Thus, by appropriately designing a driver circuit of the switch transistor Q1 to drive the switch transistor Q1 when the voltage $V_{CE}$ of the switch transistor Q1 has a minimum value, switch loss of the switch transistor Q1 can be predicted through using the following equation.

$$\frac{C_S \cdot (V_{CE})^2}{2} \cdot fo$$

where $C_S$ is an equivalent stray capacitance of the circuit, and $f_o$ is an operating frequency of the switch transistor Q1. It is clear that the switch loss of the switch transistor Q1 will be reduced significantly as the voltage $V_{CE}$ of the switch transistor Q1 drops. However, since the RCC operates in the boundary mode, the operating frequency $f_o$ of the switch transistor Q1 will increase as the input voltage Vin increases and the output load decreases. Thus, according to the above equation for calculating the switch loss, the switch transistor Q1 will still generate a substantial switch loss. Hence, when the operating frequency $f_o$ increases, the switch loss will increase significantly.

In view of the above, in order to lower the switch loss to zero for substantially eliminating the problem occurred in a high frequency operating state when the typical RCC operates in the boundary mode, the following actions should be taken by the designers and manufacturers of converters in designing their control circuits:

(1) Parallelly coupling a diode to the collector and the emitter of the switch transistor Q1 of the RCC or replacing the switch transistor Q1 with a transistor having a parasite diode (e.g., metal-oxide-semiconductor field-effect transistor, abbreviated as MOSFET) such that the voltage $V_{CE}$ of the switch transistor Q1 can be clamped at a level by the diode or the parasite diode for performing a zero voltage switch after the harmonic has reached a zero voltage level.

(2) Designing the circuitry of the RCC such that the amplitude of the above sine wave can be equal to Vin and the feedback voltage of the primary winding become larger than Vin. As a result, the minimum value of voltage $V_{CE}$ of the switch transistor Q1 is zero, and a switch is made possible when the zero voltage level is reached.

However, the cost for taking the above actions is that a transistor capable of operating in a high voltage is required since there is 2·Vin voltage drop in the switch transistor Q1. Moreover, since the cost and impedance of the transistor are relatively high, taking the above actions will unfortunately not only increase the manufacturing cost of RCC, but also increase the conduction loss of the transistor. As an end, the total performance is low. Hence, it is desirable among designers and manufacturers of the art to devise a switch transistor Q1 of converter capable of performing a zero voltage switch under a variety of loads in a boundary mode without increasing the manufacturing cost and the conduction loss in order to overcome the above drawbacks of the prior art.

SUMMARY OF THE INVENTION

A primary object of the present invention is to provide a flyback converter for performing a zero voltage switch in a boundary mode. The flyback converter comprises a transformer including a primary winding in parallel connected with a series circuit including at least one capacitor and a switch at the primary side, and a secondary winding in series connected with a switch (or a diode) at the secondary side. When the switch at the secondary side is activated into a closed condition, the switch at the primary side is also activated into a closed condition for storing the electric energy in the primary winding to the capacitor. Then, when the switch at the secondary side is activated from the closed condition into an opened condition, the switch at the primary side remains in the closed condition for a predetermined period of time enabling the capacitor to charge the primary winding until the electric energy being charged to the transformer is sufficient to cause a main switch in series connected with the primary winding to perform a zero voltage switch, and the switch at the primary side is then activated from the closed condition into an opened condition to finish the zero voltage switch. By utilizing the present invention, the above drawback of the prior ringing choke converter, such as the higher of the operating frequency the higher of the switch loss of the switch transistor, can be overcome.

One object of the present invention is to utilize the harmonic effect generated by the transformer, after the electric energy therein being transferred in the boundary mode, through cooperating with a simple control circuit, to draw the charges stored in the main switch out, enabling the main switch to perform a zero voltage switch under a variety of loads in a boundary mode and greatly reduce the switch loss thereof.

Another object of the present invention is to limit an operating frequency of the main switch in a predetermined range under a variety of loads in a boundary mode in order to greatly decrease peak value of voltage caused by inductance leakage and enable the flyback converter to have the advantages of high efficiency, high switching frequency and low noise under the condition without increasing the manufacturing cost.

The above and other objects, features and advantages of the present invention will become apparent from the following detailed description taken with the accompanying drawings.

DETAILED DESCRIPTION OF THE PREFERRED EMBODIMENTS

Figure 1:
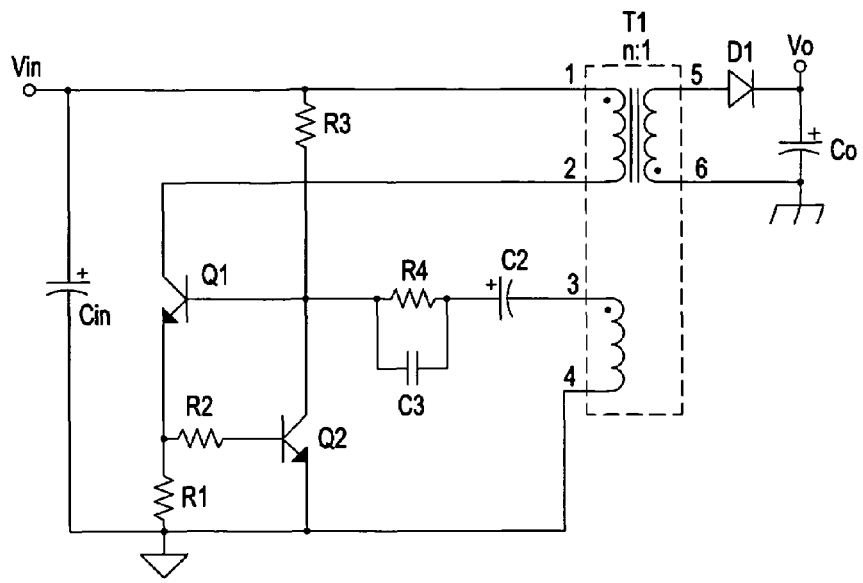
FIG. 1 is a circuit diagram of a conventional RCC.
Figure 2:
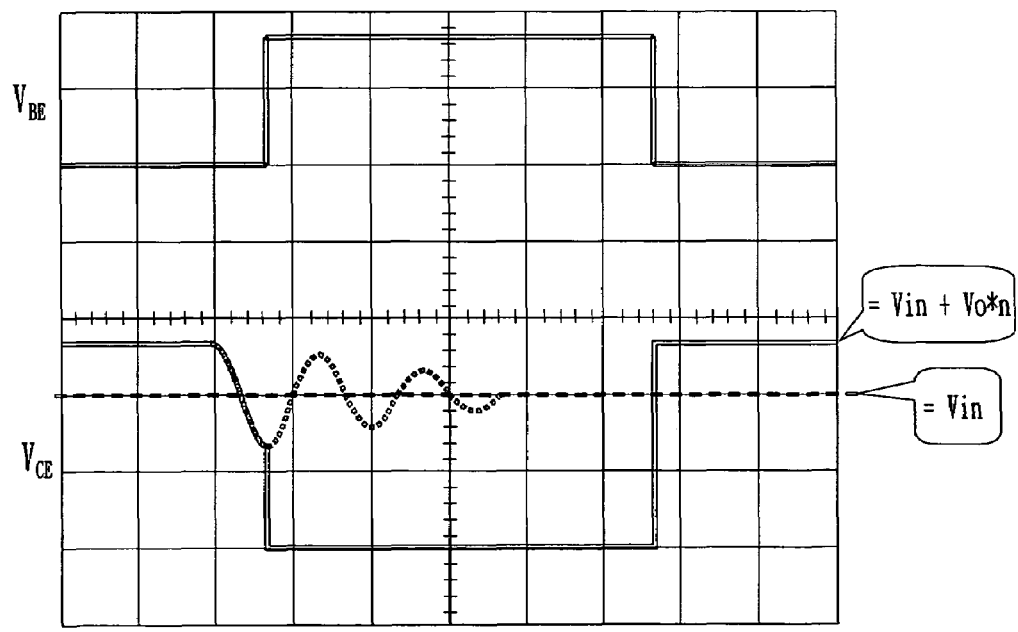
FIG. 2 is a waveform graph of the voltage $V_{CE}$ of the switch transistor Q1 of the RCC in FIG. 1 operated in a boundary mode.
Figure 3:
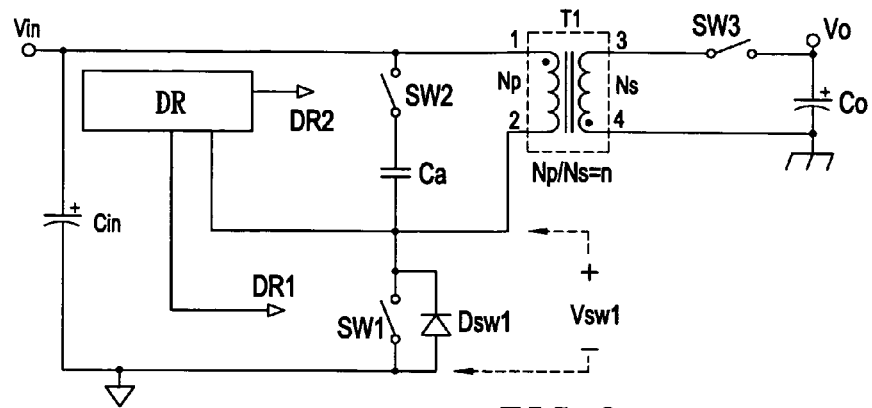
FIG. 3 is a circuit diagram of a flyback converter according to the invention.

Referring to FIG. 3, there is shown a circuit diagram of a flyback converter operated in a boundary mode according to a preferred embodiment of the invention. The converter comprises a transformer T1, an input voltage filter capacitor Cin, an auxiliary capacitor Ca, a driver circuit DR, three switches SW1, SW2, and SW3, and an output voltage filter capacitor Co. Each component will be described in detail below.

The transformer T1 is adapted to store electric energy and transfer the same. The transformer T1 comprises a primary winding Np and a secondary winding Ns in which the turn ratio of Np/Ns is n. The inductances of the primary winding Np and the secondary winding Ns are respectively Lp and Ls. The winding directions of the primary winding Np and the secondary winding Ns are marked as shown in FIG. 3. One terminal of the primary winding Np of the transformer T1 is coupled to a positive terminal of the input voltage filter capacitor Cin and the other terminal thereof is coupled to the main switch SW1. The positive and negative terminals of the input voltage filter capacitor Cin are coupled to the positive and negative terminals of the input voltage Vin respectively. One terminal of the switch SW2 at the primary side is coupled to the positive terminal of the input voltage filter capacitor Cin and the other terminal thereof is coupled to the auxiliary capacitor Ca. The other terminal of the auxiliary capacitor Ca is coupled to one terminal of the main switch SW1. The other terminal of the main switch SW1 is coupled to the negative terminal of the input voltage filter capacitor Cin. As such, the input voltage filter capacitor Cin is able to supply a stable input voltage to the transformer T1. Moreover, a diode $D_{SW1}$ is in parallel connected with the main switch SW1. The positive terminal of the diode $D_{SW1}$ is coupled to the negative terminal of the input voltage filter capacitor Cin and the negative terminal thereof is coupled to the auxiliary capacitor Ca. The driver circuit DR is coupled to a joining node of the main switch SW1 and the auxiliary capacitor Ca such that it is possible of sensing voltage at the joining node for determining whether the switch SW2 at the primary side should be cut off.

In the embodiment, one terminal of the secondary winding Ns is coupled to the negative terminal of the output voltage filter capacitor Co and the other terminal thereof is coupled to a positive terminal of the switch SW3 at the secondary side. The negative terminal of the switch SW3 at the secondary side is coupled to the positive terminal of the output voltage filter capacitor Co such that the output voltage filter capacitor Co is able to supply a stable DC output voltage Vo to a load connected to the output.

When the flyback converter operates in a boundary mode, the transformer T1 may transfer the electric energy stored therein to the secondary winding Ns for generating an output voltage Vo. At this moment, the voltage of the secondary winding is equal to Vo·n and the electric energy is stored in both the auxiliary capacitor Ca and the parasite capacitor of the circuit. When the electric energy stored in the transformer T1 is not sufficient to maintain the switch SW3 at the secondary side in a closed condition, the switch SW3 at the secondary side changes its status from the closed condition to a opened condition. At the same time, the switch SW2 at the primary side is still maintained in a closed condition, such that a harmonic is generated by parasite capacitor, the auxiliary capacitor Ca and the secondary winding Ns and the electric energy originally stored in the auxiliary capacitor Ca and the parasite capacitor will charge the primary winding Np of the transformer T1. When the electric energy being charged in the primary winding Np is sufficiently high to cause the main switch SW1 (i.e., main electronic switch) to perform a zero voltage switch, the switch SW2 at the primary side is then turned into an opened condition and the electric energy stored in the primary winding Np begins to feed back. At this moment, since the switch SW2 at the primary side is in the opened condition, the electric energy being fed back is completely stored in the parasite capacitance of the circuit. And, the harmonic behavior significantly increases the voltage variation of the parasite capacitor and increases the voltage of the main switch SW1 to a value larger than Vf in order to conduct the diode $D_{SW1}$ and enable the main switch SW1 to perform a zero voltage switch when its voltage is equal to zero. If the diode $D_{SW1}$ doen't exist, the harmonic behavior will continue to oscillate along its center Vin as indicated by dash lines of $V_{SW1}$ in FIG. 4.

By comparing the circuitry of the flyback converter of the invention with that of the conventional RCC, it is clearly seen that after the switch SW3 at the secondary side turns to be in the opened condition, the harmonic generated by the primary winding Np of the transformer T1 will slow the L-C harmonic due to the existence of the auxiliary capacitor Ca. Therefore, during the harmonic activation period, the main switch SW1 won't be activated. Thus, the operating frequency of the flyback converter of the invention is limited by a maximum value, which causes the operating frequency of the flyback converter to increase to a value less than that of the conventional RCC when the load decreases.

Figure 4:
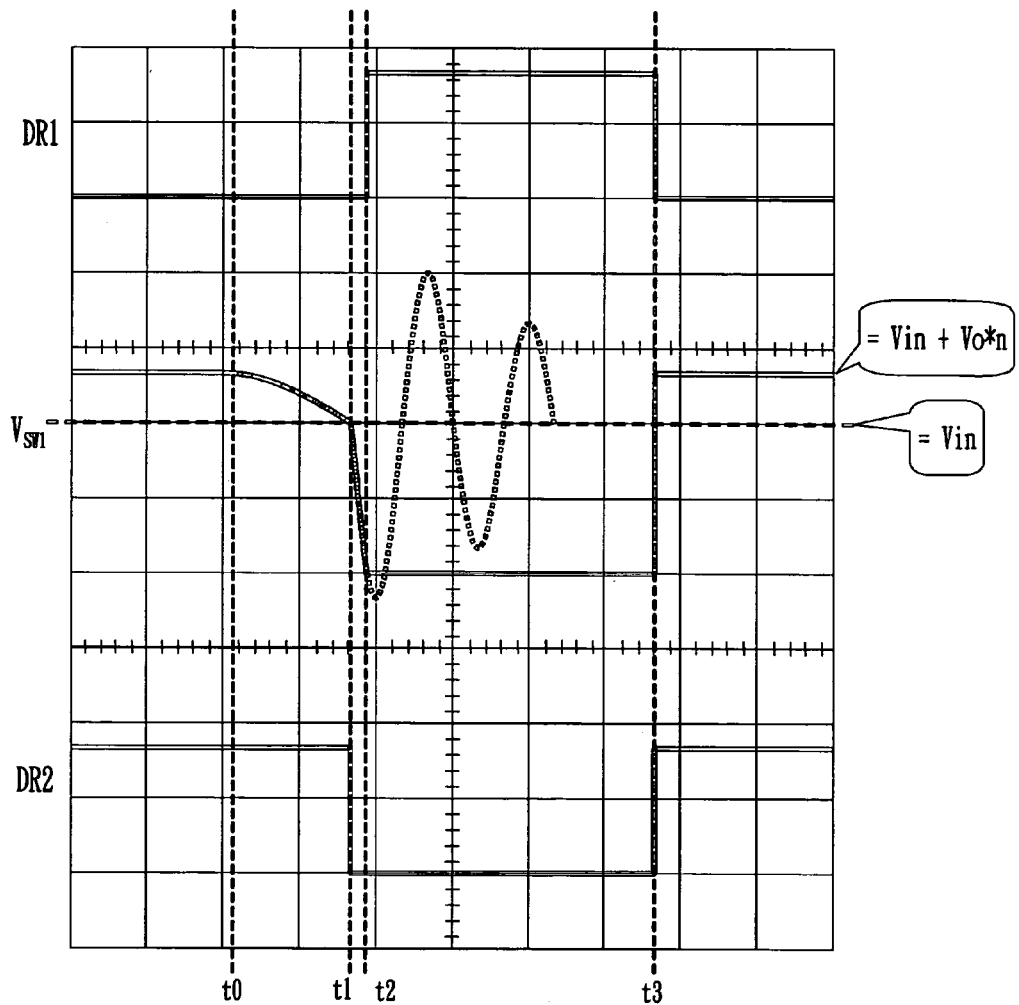
FIG. 4 is a waveform graph at four periods of time versus the voltage $V_{SW1}$ of the switch SW1 when the flyback converter operates in a boundary mode.
Figure 5A:
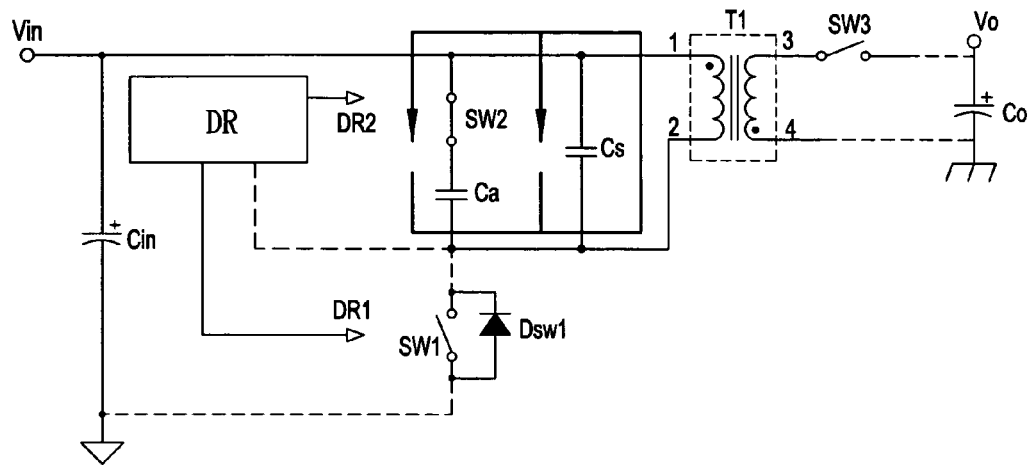
FIGS. 5(a), 5(b), 5(c), and 5(d) are equivalent circuit diagrams when the flyback converter operates in four periods of time.

Referring to FIG. 4, there is shown a waveform graph when the flyback converter operates in a boundary mode. As shown, DR1 is a driver signal sent from the driver circuit DR to the main switch SW1. $V_{SW1}$ is the voltage measured across both terminals of the main switch SW1. DR2 is a driver signal sent from the driver circuit DR to the switch SW2 at the primary side. For the convenience of discussing operation of the flyback converter of the invention, the waveforms of the driver signals DR1 and DR2 and $V_{sw1}$ of the main switch SW1 in a cycle of the main switch SW1 are divided into four periods of time. The operations of equivalent circuits of the flyback converter of the invention in respective periods of time are shown in FIGS. 5(a) to 5(d) and will be further discussed as follows:

(1) Period of Time from t0 to t1:

Referring to the equivalent circuit shown in FIG. 5(a), the parasite capacitor Cs existing in the transformer T1 and the switches SW1, SW2, and SW3 is equivalently labeled on both terminals of the primary winding Np of the transformer T1. Also, in the equivalent circuit, the region enclosed by the solid line means the operating section of the circuit and the region enclosed by the dash line means the non-operating section of the circuit. Before t0, both the switch SW2 at the primary side and the switch SW3 at the secondary side are in closed condition, the transformer T1 is in a status of transferring electric energy, and the voltage of the auxiliary capacitor Ca and the parasite capacitor Cs is equal to Vo/N, a voltage fed back from output voltage Vo to the primary winding Np.

When t=t0, the switch SW3 at the secondary side will turn to be in an opened condition, since the electric energy stored in the transformer T1 is not sufficient to maintain the switch SW3 at the secondary side in the closed condition. In a period of time from t0 to t1, a harmonic is generated by the auxiliary capacitor Ca, the parasite capacitor Cs, and inductance Lp of the primary winding Np of the transformer T1, and the electric energy stored in the auxiliary capacitor Ca and the parasite capacitor Cs will be transferred to the inductance Lp of the primary winding Np.

Figure 5B:
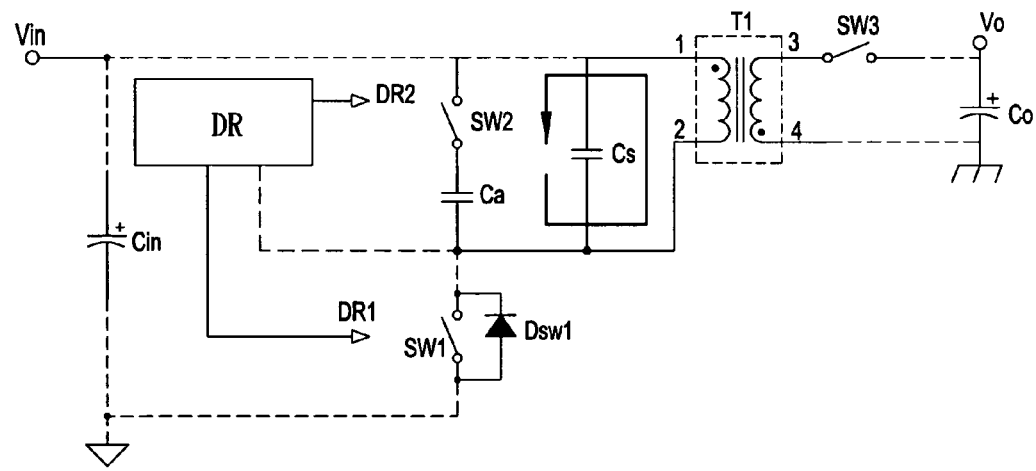

(2) Period of Time from t1 to t2:

Referring to the equivalent circuit shown in FIG. 5(b), this period of time is critical to zero voltage switch of the main switch SW1. In time t1, the driver circuit DR generates a driver signal DR2 and sends the same to the switch SW2 at the primary side for turning the switch SW2 at the primary into an opened condition in response to sensing that the voltage across both terminals of the primary winding Np (i.e., the voltage at both terminals of the auxiliary capacitor Ca) has dropped below a predetermined level, and turning the auxiliary capacitor Ca into an open loop. Only the parasite capacitor Cs can continue to generate harmonic through in cooperation with the inductance Lp of the primary winding Np.

Before t1, all the electric energy stored in the auxiliary capacitor Ca and the parasite capacitor Cs is substantially transferred to the inductance Lp of the primary winding Np. Therefore, when t=t1, the electric energy stored in the inductance Lp of the primary winding Np is transferred back to the capacitors. At this moment, since the auxiliary capacitor Ca is absent from the capacitors of the harmonic elements, the electric energy stored in the inductance Lp of the primary winding Np will cause the voltage across the parasite capacitor Cs to increase rapidly. If the voltage variation on the parasite capacitor Cs is called as V1, then according to the following equation:

$$\frac{1}{2} \cdot (Ca + Cs) \cdot \left(\frac{Vo}{n}\right)^2 \to \frac{1}{2} \cdot Lp \cdot i_P^2 \to \frac{1}{2} \cdot Cs \cdot V1^2,$$

the voltage variation V1 across the parasite capacitor Cs is equal to $$V1 = \frac{Vo}{n} \cdot \sqrt{1 + \frac{Ca}{Cs}}.$$

Beside, since the critical moment for performing zero voltage switch is at the time when V1 larger than Vin, i.e.:

$$\frac{Vo}{n} \cdot \sqrt{1 + \frac{Ca}{Cs}} > Vin$$

Thus, if the selected auxiliary capacitor Ca has a sufficient capacitance, the voltage of the main switch SW1 will decrease to zero due to harmonic.

Figure 5C:
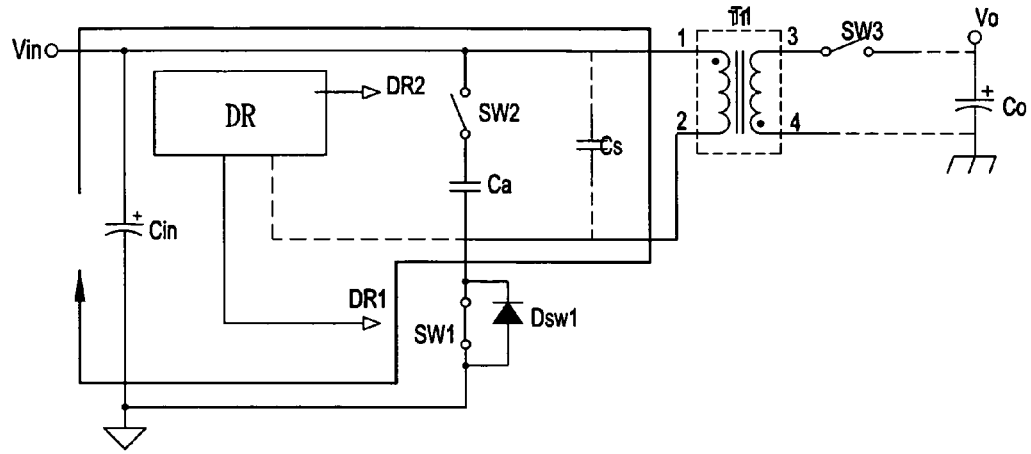

(3) Period of Time from t2 to t3:

Referring to the equivalent circuit shown in FIG. 5(c), when t=t2, the voltage of the main switch SW1 will drop below Vf and cause the diode $D_{sw1}$ in parallel connected with the main switch SW1 to be conducted. The voltage of the main switch SW1 is then clamped at −Vf, at this moment the main switch SW1 is preparing to proceed with the action of zero voltage switch. Thus, when the driver circuit DR generates a driver signal DR1 and sends the same to the main switch SW1, the main switch SW1 turns into a closed condition and completes the action of zero voltage switch. Moreover, in the period of time from t2 to t3, the transformer T1 begins to store the electric energy.

Figure 5D:
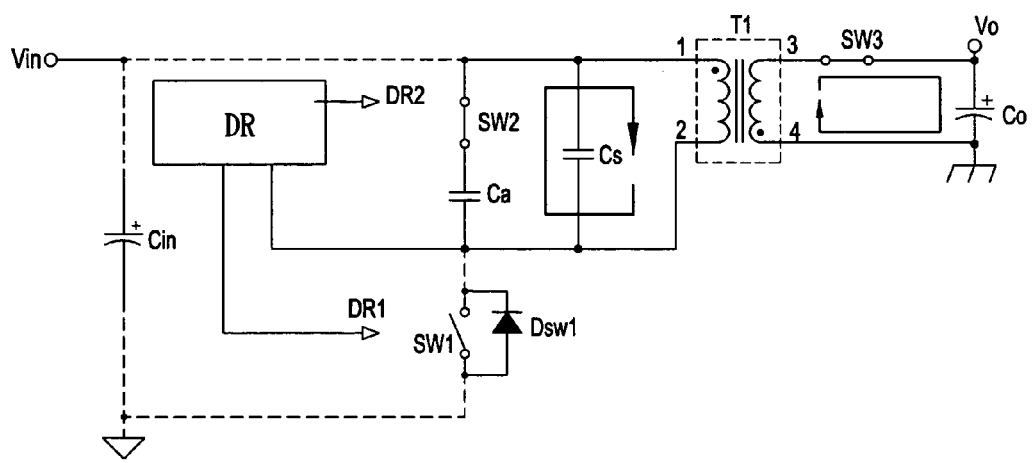

(4) Period of Time from t3 to t0:

Referring to the equivalent circuit shown in FIG. 5(d), when t=t3, the driver circuit DR generate a driver signal DR1 and a driver signal DR2 and send the same to the main switch SW1 and the switch SW2 at the primary side respectively for turnling the main switch SW1 into an opened condition and turning the switch SW2 at the primary side into a closed condition. In the period of time from t3 to t0, the transformer T1 begins to transfer the electric energy stored therein. When t=t0, the main switch SW1 is in the opened condition and the transformer T1 thus begins to transfer the stored electric energy to both the auxiliary capacitor Ca and the parasite capacitor Cs, the voltage of the transformer T1 thus changes its polarity for turning the switch SW3 at the secondary side into a closed condition. At this moment, since the driver circuit DR senses that the voltage $V_{NP}$ of the primary winding Np of the transformer T1 has changed from negative to positive, the driver circuit DR will generate a driver signal DR2 and send the same to the switch SW2 at the primary side to turn the switch SW2 at the primary side into a closed condition. The voltage of the auxiliary capacitor Ca and the parasite capacitor Cs is then equal to Vo/n, which is a voltage fed back from the output voltage Vo to the transformer T1.

Figure 6:
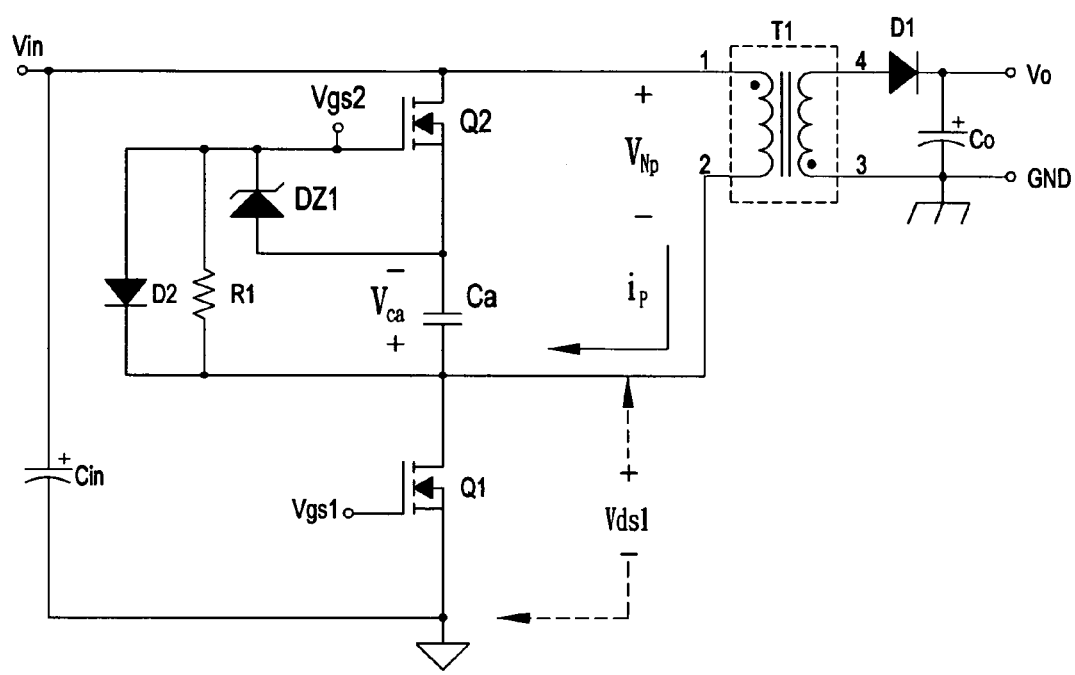
FIG. 6 is a circuit diagram of a preferred embodiment of the invention.
Figure 7:
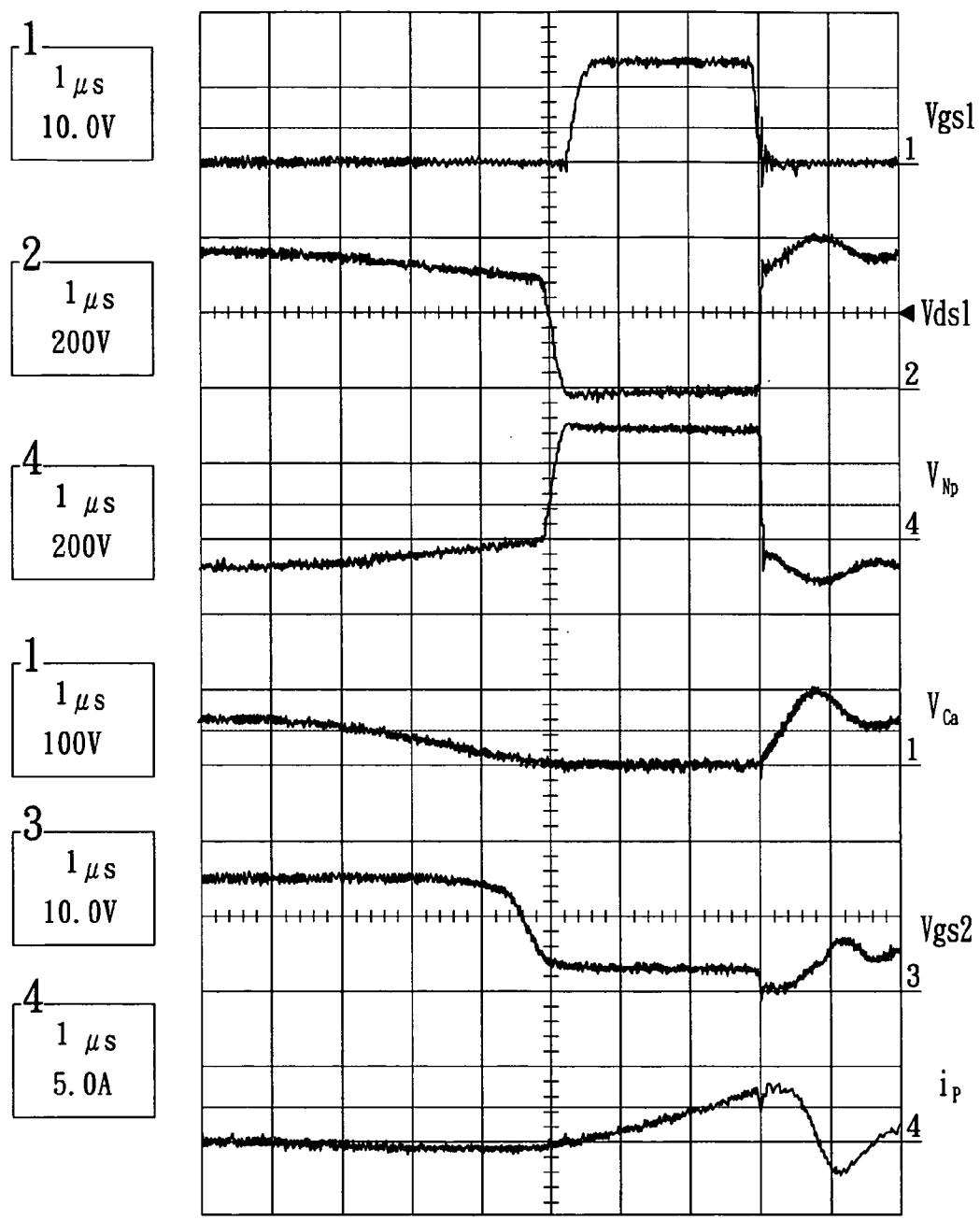
FIG. 7 is a waveform graph showing voltage values of the components shown in the preferred embodiment of the invention in FIG. 6.

Referring to FIG. 6, there is shown a circuit diagram of a preferred embodiment of the invention. In the embodiment, each of the main switch SW1 and the switch SW2 at the primary side mentioned in the invention can be replaced by metal-oxide-semiconductor field-effect transistors (MOSFETs) Q1 and Q2 respectively. Further, the switch SW3 at the secondary side mentioned in the invention can be replaced by a diode D1. The embodiment is then measured to obtain a waveform graph showing voltage values of the components of the circuit in the embodiment as shown in FIG. 7, wherein it is clearly seen that the voltage Vds1 of the main transistor Q1 slowly drops from a maximum value to a value about equal to the input voltage Vin (in the embodiment, the input voltage Vin is about equal to 350V). However, when the transistor Q2 at the primary side is turned into an opened condition, i.e. when the driver signal Vgs2 changes from high to low, the voltage Vds1 of the main transistor Q1 will rapidly drop to a value about equal to 0V. At this moment, the driver signal Vgs1 quickly changes from low to high. As a result, the main transistor Q1 completes the action of zero voltage switch.

In view of the above, the flyback converter of the invention utilizes the harmonic effect generated by the transformer, after the electric energy therein being transferred in the boundary mode, through cooperating with a simple control circuit to draw the charges stored in the main switch out and enable the main switch to perform a zero voltage switch under a variety of loads in a boundary mode, which not only greatly reduces the switch loss thereof, but also effectively limits an operating frequency of the main switch in a predetermined range to greatly decrease the peak value of voltage caused by inductance leakage and enable the flyback converter to have the advantages of high efficiency, high switching frequency and low noise under the condition without increasing the manufacturing cost.

While the invention has been described by means of specific embodiments, numerous modifications and variations could be made thereto by those skilled in the art without departing from the scope and spirit of the invention set forth in the claims.

What is claimed is:

1. A flyback converter for performing a zero voltage switch in a boundary mode, comprising:
   a transformer including a primary winding and a secondary winding;
   a series circuit including at least one auxiliary capacitor and a switch at the primary side in series connected with the auxiliary capacitor, the series circuit being in parallel connected with the primary winding;
   a switch at the secondary side being in series connected with the secondary winding;
   a main switch being in series connected with one terminal of the series circuit adjacent to the auxiliary capacitor; and
   at least one driver circuit interconnected the main switch and the auxiliary capacitor for sensing voltage at a joining node of the main switch and the auxiliary capacitor, generating a driver signal, and sending the same to the switches at the primary and the secondary sides for switching them respectively;
   wherein when the switch at the secondary side is turned into a closed condition, the switch at the primary side is switched to a closed condition enabling the switch at the primary side to store the electric energy of the primary winding to the auxiliary capacitor; when the switch at the secondary side is turned from the closed condition into an opened condition, the closed condition of the switch at the primary side is maintained for a predetermined period of time enabling the auxiliary capacitor to charge the primary winding until the electric energy being charged into the transformer is sufficient to cause the main switch to perform a zero voltage switch.

2. The flyback converter of claim 1, further comprising a diode in parallel connected with the main switch.

3. The flyback converter of claim 2, further comprising an input voltage filter capacitor having a positive terminal coupled to one terminal of the primary winding and a negative terminal coupled to the main switch, wherein the positive and the negative terminals of the input voltage filter capacitor are coupled to the positive and negative terminals of an input voltage.

4. The flyback converter of claim 3, wherein one terminal of the switch at the primary side is coupled to a positive terminal of the input voltage filter capacitor and the other terminal thereof is coupled to the auxiliary capacitor.

5. The flyback converter of claim 4, wherein a positive terminal of the diode is coupled to a negative terminal of the input voltage filter capacitor and a negative terminal thereof is coupled to the auxiliary capacitor.

6. The flyback converter of claim 5, wherein the main switch is a metal-oxide-semiconductor field-effect transistor (MOSFET).

7. The flyback converter of claim 5, wherein the switch at the primary side is a metal-oxide-semiconductor field-effect transistor (MOSFET).

8. The flyback converter of claim 1, further comprising an output voltage filter capacitor having a negative terminal coupled to one terminal of the secondary winding and a positive terminal coupled to the switch at the secondary side wherein the positive and the negative terminals of the output voltage filter capacitor are coupled to the positive and negative terminals of an output voltage.

9. The flyback converter of claim 8, wherein the switch at the secondary side is a diode.

* * * * *

UNITED STATES PATENT AND TRADEMARK OFFICE
CERTIFICATE OF CORRECTION

PATENT NO.         : 6,950,318 B2                                           Page 1 of 1
APPLICATION NO.    : 10/824471
DATED              : September 27, 2005
INVENTOR(S)        : Jim H. Liang et al.

It is certified that error appears in the above-identified patent and that said Letters Patent is hereby corrected as shown below:

Col. 7, line 17 of claim 1, change "a driver signal" to --driver signals--.

Col. 8, line 18 of claim 1, change "switches at the primary and the secondary sides"" to --switch at the primary side and the main switch--.

Signed and Sealed this
Fourteenth Day of August, 2012

David J. Kappos
*Director of the United States Patent and Trademark Office*